N. A. CATES.
Cultivator.
No. 69,314.　　　　　　　　　　　　　　　Patented Oct. 1, 1867.
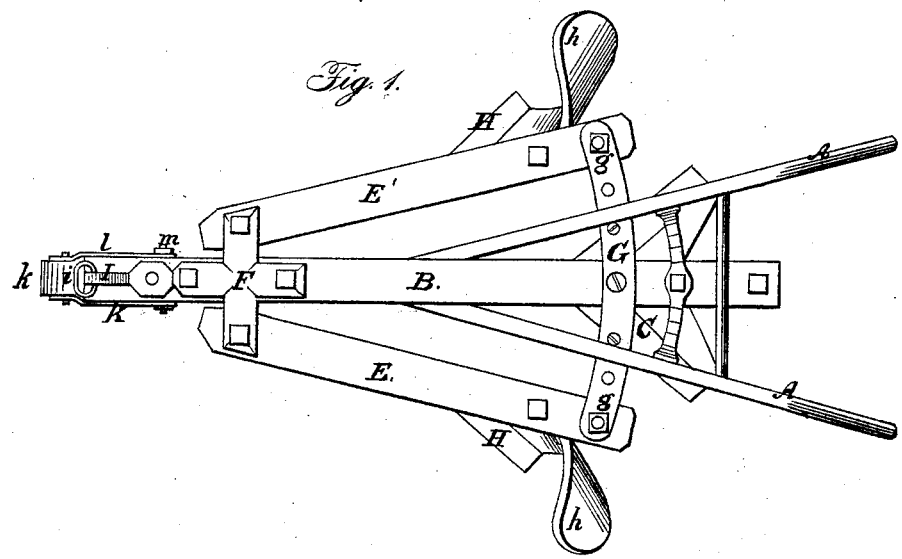
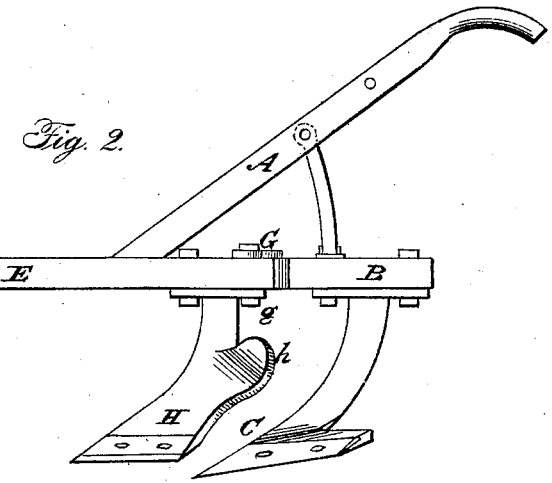

United States Patent Office.

NATHAN A. CATES, OF THORNDIKE, MAINE.

Letters Patent No. 69,314, dated October 1, 1867.

IMPROVEMENT IN CULTIVATORS.

*The Schedule referred to in these Letters Patent and making part of the same.*

TO ALL WHOM IT MAY CONCERN:

Be it known that I, NATHAN A. CATES, of Thorndike, in the county of Waldo, and State of Maine, have invented a new and useful Improvement in Cultivators, of which the following is a full, clear, and exact description, reference being had to the accompanying drawings, which make part of this specification, and in which—

Figure 1 represents a plan view, and

Figure 2 a side elevation of my improved cultivator.

The invention herein claimed relates to a novel mode of combining with a scraper or horse-hoe laterally adjustable ploughs, which both turn a furrow and smooth the ridge, as hereinafter more fully shown.

In the accompanying drawings, handles A are shown as rigidly secured to a central beam, B, having a scraper, C, secured to its rear end, and a coulter, D, similarly bolted to it, near its forward end, in line with the point of the scraper. Two side beams, E E', are pivoted in line with the coulter, in a bracket or socket, F, so as to permit them to swing horizontally to or from the central beam B. They are held in any desired position by a cross-bar, G, provided with a series of holes through which screw-bolts $g$ pass. Ploughs H are bolted to the rear ends of the beams. These ploughs, it will be seen, have single mould-boards, so arranged as to throw the earth outward, while the wings $h$ are unusually prolonged and curved over so as not only to turn the furrow well over, but to smooth it off besides. The team is attached to a suitable clevis, $i$, adjustable up or down in holes in the draught-bracket I, so as to raise or lower the line of draught as required. A leading-roller, $k$, is mounted in a yoke, K, rocking vertically on a pivot, $l$, and is held in any desired position by a pin, $m$, passing horizontally through the central beam and through one of a series of holes in the upper end of the yoke. This roller prevents the front of the plough from running too deep into the ground.

In operation the coulter serves to guide the front of the machine and to stir up the ground while the scraper cleans the space between the furrows made by the ploughs, which throw the earth outward to form a ridge, and then smooth the ridge by their overlying wings. I thus combine in one machine the advantages both of a cultivator and a horse-hoe.

What I claim as my invention, and desire to secure by Letters Patent, is—

1. The combination of the central beam (carrying the adjustable roller, the coulter, and the scraper) with the laterally adjustable beams, (carrying the ridging and smoothing-ploughs,) the combination being and operating substantially as described for the purposes set forth.

2. The combination with the scraper of the laterally adjustable ploughs, all constructed and arranged for joint operation as described.

3. The laterally adjustable furrow-turning and ridge-smoothing ploughs, constructed and operating as described.

4. The combination with the central beam and coulter of the clevis-bracket and adjustable yoke, carrying the leading-roller, all constructed, arranged, and operating as described.

In testimony whereof I have hereunto subscribed my name.

NATHAN A. CATES.

Witnesses:
GEO. G. DAVIS,
EDW. F. CUTTER,